United States Patent
Guo

(10) Patent No.: US 11,491,914 B2
(45) Date of Patent: Nov. 8, 2022

(54) METHOD FOR PROVIDING AN IMAGE REPRESENTATION OF AT LEAST PART OF AN ENVIRONMENT OF A VEHICLE, COMPUTER PROGRAM PRODUCT AND DRIVER ASSISTANCE SYSTEM

(71) Applicant: Connaught Electronics Ltd., Tuam (IE)

(72) Inventor: Huanqing Guo, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 0 days.

(21) Appl. No.: 17/267,209

(22) PCT Filed: Jul. 24, 2019

(86) PCT No.: PCT/EP2019/069857
§ 371 (c)(1),
(2) Date: Feb. 9, 2021

(87) PCT Pub. No.: WO2020/030427
PCT Pub. Date: Feb. 13, 2020

(65) Prior Publication Data
US 2021/0309150 A1      Oct. 7, 2021

(30) Foreign Application Priority Data

Aug. 10, 2018   (DE) .................. 102018119481.1

(51) Int. Cl.
*B60R 1/00*       (2022.01)
*H04N 5/262*      (2006.01)

(52) U.S. Cl.
CPC ............. *B60R 1/00* (2013.01); *H04N 5/2628* (2013.01); *B60R 2300/10* (2013.01); *B60R 2300/20* (2013.01); *B60R 2300/80* (2013.01)

(58) Field of Classification Search
CPC ... B60R 1/00; B60R 2300/10; B60R 2300/20; B60R 2300/80; B60R 2300/305;
(Continued)

(56) References Cited

U.S. PATENT DOCUMENTS

| 2010/0194596 | A1* | 8/2010 | Wang ................... B60R 1/00 340/936 |
| 2011/0032357 | A1* | 2/2011 | Kitaura ............... G06T 3/0056 348/148 |

(Continued)

FOREIGN PATENT DOCUMENTS

| DE | 102011084524 A1 | 4/2013 |
| JP | 2010-183170 A | 8/2010 |
| JP | 4867512 B2 * | 2/2012 |

OTHER PUBLICATIONS

International Search Report and Written Opinion in corresponding International Application No. PCT/EP2019/069857, dated Oct. 15, 2019 (9 pages).

(Continued)

*Primary Examiner* — Susan E. Torgerson
(74) *Attorney, Agent, or Firm* — Osha Bergman Watanabe & Burton

(57) ABSTRACT

The invention relates to a method for providing an image representation (15) of an environment (7) of a vehicle (1), wherein the environment (7) of the vehicle (1) is captured at least partly, an image representation (15) of at least one first part (10a) of the captured environment (7) is provided within a defined viewport (10) from a defined perspective (11), wherein the image representation (15) includes a vehicle representation (14) representing the vehicle (1), and wherein the image representation (15) is displayed on a display device (12). Further, when providing the image representation (15) at least one second part (16a) of the captured environment (7) is represented in form of a mir- (Continued)

Figure 1:
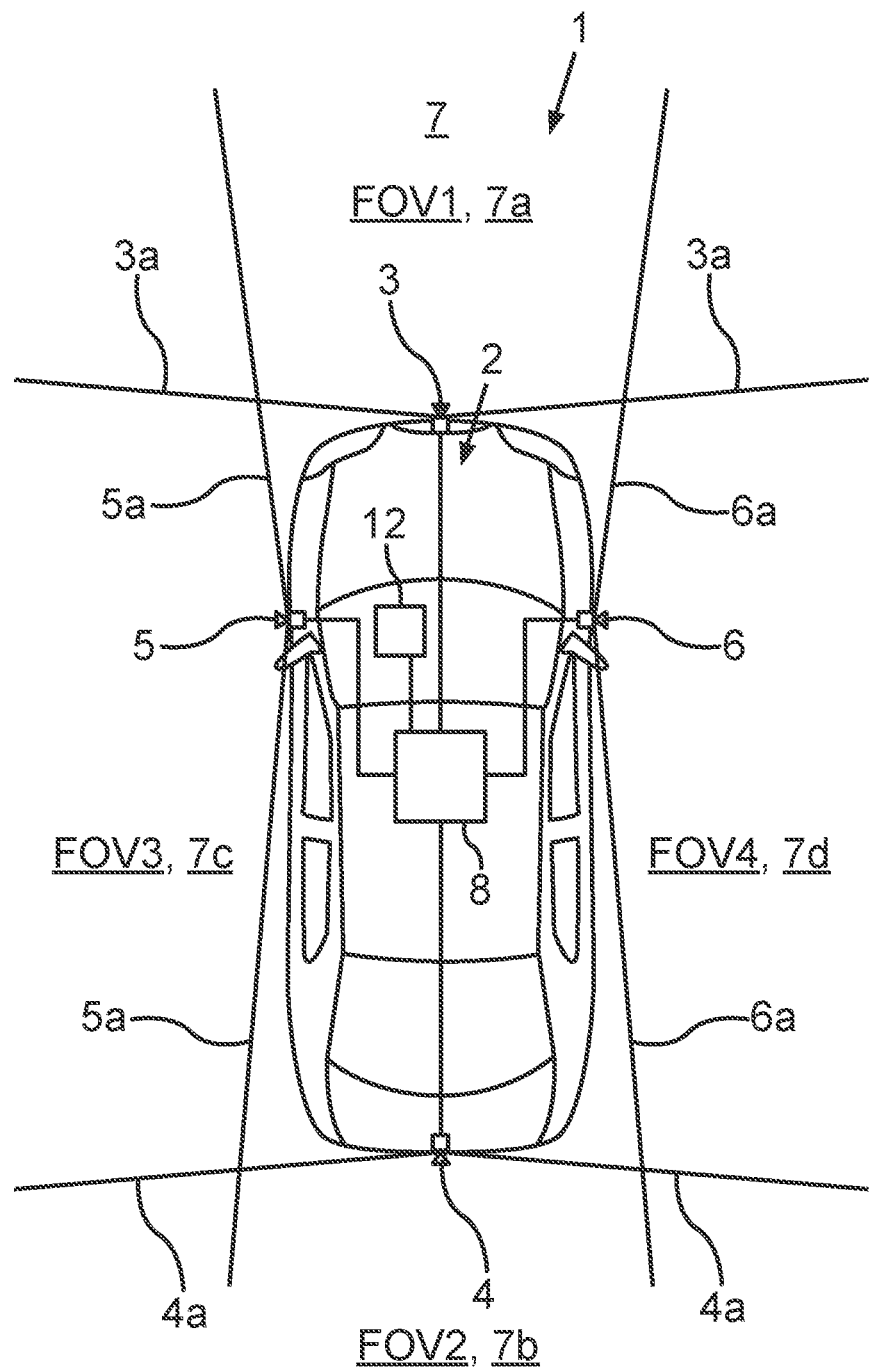

rored image (18) of the at least one second part (16*a*) of the environment (7) on a defined region (17, 19, 20) of the vehicle representation (14).

13 Claims, 3 Drawing Sheets

(58) Field of Classification Search
CPC ...... H04N 5/2628; H04N 7/181; B60K 35/00; B60K 2370/152; B60K 2370/176; B60K 2370/21; B60K 2370/785; B60Y 2400/3015
USPC .......................................................... 348/118
See application file for complete search history.

(56) References Cited

U.S. PATENT DOCUMENTS

| | | | |
|---|---|---|---|
| 2012/0257058 A1* | 10/2012 | Kinoshita | G06T 3/0012 |
| | | | 348/148 |
| 2014/0043466 A1 | 2/2014 | Sato et al. | |
| 2017/0195564 A1* | 7/2017 | Appia | H04N 5/247 |
| 2018/0342046 A1* | 11/2018 | Tomatsu | G02B 27/017 |

OTHER PUBLICATIONS

German Search Report in corresponding German Application No. 10 2018 119 481.1, dated Dec. 6, 2018 (7 pages).
Notification of Reason for Rejection in corresponding Japanese Application No. 2021-506997, dated Apr. 1, 2022 (13 pages).

* cited by examiner

METHOD FOR PROVIDING AN IMAGE REPRESENTATION OF AT LEAST PART OF AN ENVIRONMENT OF A VEHICLE, COMPUTER PROGRAM PRODUCT AND DRIVER ASSISTANCE SYSTEM

The invention relates to a method for providing an image representation of at least part of an environment of a vehicle on a display device, wherein the environment of the vehicle is captured at least partly by means of at least one vehicle sensor and an image representation of at least part of the captured environment is provided within a defined viewport from a defined perspective, wherein the image representation includes a vehicle representation representing the vehicle. Furthermore, the image representation is displayed on the display device. The invention also relates to a computer program product and a driver assistance system for a vehicle for providing an image representation of at least part of an environment of the vehicle.

There are systems known from the prior art, which manage to provide for example a 360° surround view of a vehicle, which can be displayed on a display device of the vehicle to assist the driver for example in parking the vehicle. For this purpose for example a top view of the 360° surrounding of the vehicle including a vehicle representation, for example a 2D bitmap image of the vehicle itself, can be shown in planar view. Also systems are known, which are able to provide a 3D vehicle model, which allows for a dynamic change of the perspective onto the displayed scene. Usually, for capturing the environment for the purpose of providing such a visualization, a camera system of the vehicle comprising several cameras is used. In such multi camera automotive vision systems, different types of view can be generated using multiple camera images. In such visualization framework comprising several cameras and an electronic computation unit, the raw camera images are first mapped to a target viewport and merged, generating thus a mosaic image that represents the view from a particular 3D point somewhere around the vehicle. In the simplest case, the virtual camera is placed above the car looking from the top central position and the projected surface is a flat 2D plane. This view is usually referred to as top view as mentioned above. More general cases include, for example, a bowl view, where the projective 2D surface has a bowl shape, and a virtual camera or a virtual point of view is positioned in any arbitrary position of the 3D space.

Though being able to change the perspective onto the environmental scene including the vehicle representation, it still may happen that from a certain chosen perspective parts of the environment, which may comprise relevant information, are out of the defined viewport and therefore are not displayed and cannot be seen by the user. This can lead to very critical situations. To ensure that the user has not missed any relevant information, the user could change the perspective of the representation all around the vehicle. However, this would be very time consuming and discomforting for the user. Consequently, most users for convenience do not change the perspective all the time to ensure that no important information has been missed. This again can lead to very critical situations.

Therefore it's an objective of the present invention to provide a method for providing an image representation of at least part of an environment of a vehicle on a display device, a computer program product and a driver assistant system, by means of which the risk of missing important environmental information can be reduced.

This object is solved by a method, by a computer program product, and by a driver assistance system comprising the features according to the corresponding independent claims. Advantageous embodiments of the invention are presented in the dependent claims, the description and the drawings.

According to a method in the context of the invention for providing an image representation of at least part of an environment of a vehicle on a display device, the environment of the vehicle is at least partly captured by means of at least one vehicle sensor, and an image representation of at least one first part of the captured environment is provided within a defined viewport from a defined perspective, wherein the image representation includes a vehicle representation representing the vehicle. Moreover, the image representation is displayed on the display device. Furthermore, when providing the image representation, at least one second part of the captured environment is represented in form of a mirrored image of the at least one second part of the environment on a defined region of the vehicle representation.

So, advantageously, part of the environment, namely the at least one second part of the environment, can be represented as a reflection on a defined region of the vehicle, for example on a window of the vehicle representation. This has several great advantages. First of all, thereby it's possible that a part of the environment, which actually couldn't be seen from the current chosen perspective, can still be made visible for a user on the display device in form of the reflection, namely the mirrored image, on at least part of the vehicle representation. Consequently, additional information about the environment of the vehicle can be displayed simultaneously for a defined perspective and a defined viewport. Thereby, the risk that important information in the environment of the vehicle is missed by the driver can be enormously reduced. For example, in case the environmental scene including the vehicle representation is displayed on the display device from a perspective looking from behind onto the vehicle representation and in case the driver is currently performing a parking manoeuver for parking the vehicle backwards into a parking space behind the vehicle, then usually the parking space itself cannot be seen from the described perspective looking from behind onto the vehicle representation, as from such a perspective essentially only environmental information in front of the vehicle is displayed. However, by means of the invention, now it is possible to still see the parking space behind the vehicle and the area around as a reflection of the rear window of the vehicle representation, especially additionally to the representation of the part of the environment in front of the vehicle. Thereby, by means of the invention, the driver or user can be provided with much more relevant information about the vehicle environment, which provides much better assistance in different driving or parking situations and thereby enhances safety enormously. Another great advantage of the invention is, that this second part of the environment is displayed in form of a mirrored image or reflection on the defined region of the vehicle representation. On the one hand, by providing this mirrored image on part of the vehicle representation, possibly important information provided by the at least one first part of the captured environment cannot be concealed by the mirrored image. On the other hand, by providing the information about the second part of the environment in form of a reflection or mirrored image, a natural impression of light reflection can be provided for the user such that this additional information is provided in very natural and realistic way and therefore is very easily and intuitively recognizable for the user. This again results in less distraction or irritation of the user and thereby also the safety can be enhanced and the risk of missing important information can be reduced again. Moreover, this kind of realistic representation supports the driver in recognizing, that this additionally displayed content, which is represented in form of the mirrored image, in fact shell constitute a reflection or mirrored image of the second part of the environment, which is very helpful be able to correctly localize this second part of the environment represented by the mirrored image relative to the vehicle.

Preferably, the at least one vehicle sensor is configured as a camera. Moreover, it's preferred, that the vehicle comprises several cameras, especially with a total field of view of 360°. The environmental images captured by these cameras can then be merged together and mapped to a defined viewport from a chosen perspective as described above. However, in general, the at least one vehicle sensor can be configured as any arbitrary vehicle sensor, like a laser scanner, an ultrasonic sensor and/or a radar. By means of all these sensors a representation of the environment of the vehicle or at least part thereof can be provided by suitable processing of the captured sensor data to provide an image representation of the captured environmental information.

Further, the mirrored image constitutes an image of the at least one second part of the environment, which has been mirrored, especially computationally mirrored, in a predefined way, e.g. according to the physical reflection law or also with defined deviations from the physical reflection law, which is described later on in more detail.

Moreover, according to a preferred embodiment of the invention, the second part of the environment at least in part differs from the first part of the environment. In other words, by means of the mirrored image parts of the environment of the vehicle are visible, which otherwise wouldn't be from the defined perspective on the defined viewport. So advantageously, the driver or user of the vehicle can be provided with additional information about his environment and the risk of missing important information can be reduced.

Furthermore, it is very advantageous when the defined region of the vehicle representation constitutes a part of the vehicle representation that relates to a window of the vehicle, especially a windscreen and/or a rear window and/or a roof window and/or a side window. Thereby the natural appearance of the vehicle representation can be maintained though additionally displaying the mirrored image, and the risk of a possible distraction or irritation of the user can be reduced. Nevertheless, generally the mirrored image can be provided on any arbitrary part of the vehicle representation, e.g. on parts representing a door of the vehicle or a boot lid.

According to another advantageous embodiment of the invention the certain mirror image is determined in dependency of the defined perspective and/or a defined geometry of a mirror plane, which is associated with a defined region of the vehicle representation, on which the mirrored image is displayed, and/or in dependency of the position and/or orientation of the mirror plane relative to the defined perspective. Thereby a very natural appearance of the mirrored image can be achieved, as these dependencies correspond to the laws of real reflections. In other words, which second part of the environment is represented by means of the mirrored image depends on the positon of the defined perspective as well as on the incline of the surface of the vehicle representation, e.g. the geometry and surface incline of the windows of the vehicle representation and the positon of these virtually reflective surfaces relative to the virtual point of view, from which the whole scene is finally displayed on the display device.

Furthermore, the vehicle representation can be provided in form of a 2D image of the car, especially a bitmap image, representing the vehicle from the defined perspective. Such a vehicle representation in form of a 2D image of the vehicle is especially advantageous, for example for a top view. But also other views on the scene can be provided in form of several different defined perspectives. In this case, a respective 2D image can be defined for each perspective. Using a 2D image of the vehicle as vehicle representation has the advantage, especially in combination with the representation of the mirrored image on part of the vehicle representation, that this is particularly computationally inexpensive. So for each perspective a corresponding mirror plane associated with a defined region of the vehicle representation can be defined and the mirrored image can be calculated easily from a given perspective.

Therefore it is another advantageous embodiment of the invention, when the perspective is adjustable to several predefined discrete perspectives, wherein for each of the predefined perspectives a corresponding 2D image of the vehicle is stored, and wherein in case the perspective changes the 2D image and the mirrored image are changed correspondingly. So advantageously also with limited processing power multiple different views on a scene can be provided, which advantageously are enriched with additional information provided by the mirrored image, especially respective mirrored images, as the content of the mirrored image also depends on the chosen perspective.

According to another advantageous embodiment of the invention the vehicle representation is provided in form of a vehicle model, especially a 3D vehicle model, wherein the geometry of the mirror plane is determined by the geometry of the defined region of the vehicle model, on which the mirrored image is displayed. In other words, for calculating a realistic reflection of the environment on part of the vehicle model, simply the geometry of this part of the 3D vehicle model can be used for these calculations. By means of using a 3D vehicle model as vehicle representation, especially in combination with a mirrored image, a much more realistic visualization of a scene, especially a dynamically changeable visualization can be provided.

Therefore it's another advantageous embodiment of the invention, when the defined perspective is dynamically adjustable, wherein the representation of the vehicle model and the mirrored image are dynamically adjusted in dependency of the dynamically adjusted perspective. Thereby environmental information can be provided from any arbitrary point of view in 3D space and advantageously continuous transitions can be provided between different perspectives.

Moreover, on the one hand, the mirrored image can simply be calculated based on the physical light reflection law. Therefore it's another advantageous embodiment of the invention, when the mirrored image is determined based on the physical light reflection law. This results in a very natural and realistic appearance of the finally displayed representation. On the other hand, it might be also very advantageous when the calculation of the mirrored image does not strictly follow the physical light reflection law.

Therefore it's another advantageous embodiment of the invention, when the mirrored image is determined based on a defined deviation from the physical light reflection law. For example the content to be shown on the vehicle representation as reflection can be predesigned, e.g. to show otherwise hided surround scenes such as critical scenes from the far corners of the vehicle. For example, the mirrored image can be computed as if light from the second part of the environment would have passed through a certain virtual optic first, like a virtual lens, and then is reflected by the mirror plane to the virtual point of view. The design of such a virtual optic then defines the defined deviation. Thereby, a user can be provided with even more important information.

Especially it is very advantageous, when the mirrored image is determined based on the defined deviation from the physical light reflection law such that a field of view from the defined perspective onto the second part of the environment represented by the mirrored image is larger than it would be in case the mirrored image was determined based on the physical light reflection law without defined deviation. Preferably, the field of view is enlarged especially in the horizontal direction, namely perpendicular to the vertical axis of the vehicle, which is very advantageous in most driving or parking situations. To create such a large field of view, not only the input data of only one single sensor, like a single camera, can be used, but the calculation of the mirrored image can also be based on environmental data provided by different sensors, especially different, e.g. neighboring, cameras, and the respective provided environmental data can then be suitably fused and merged together. The mirrored image can be computed by modelling light from the second part of the environment passing through a virtual lens that has e.g. a fisheye characteristic in the horizontal direction, so that an especially large field of view, is provided in the horizontal direction, and then being virtually reflected on the defined mirror plane to the virtual point of view.

According to another advantageous embodiment of the invention, the defined region of the vehicle representation is changed in dependency of a change of the defined perspective. As explained above, it is very advantageous, if the defined region of the vehicle representation constitutes for example a window of the vehicle representation. As the vehicle representation, like a usual car, also comprises several windows, like a windscreen, a rear window, side windows and possibly a roof window, it is possible to use all these window representations of the vehicle representation as the defined region, on which finally the mirrored image, or also several respective mirrored images at the same time, is displayed. However, depending on the perspective, some of these window representations might be in a better position than others to be used as mirror plane. For example, if an image representation is displayed from a perspective looking from behind onto the vehicle representation, then using the rear window as the mirror plane to display the mirrored image is more suitable than for example using the windscreen, especially as from such a perspective the windscreen of the vehicle representation might not be even visible. So according to this advantageous embodiment of the invention, also the region of the vehicle representation, on which the mirrored image shall be displayed, can advantageously be chosen in dependency of the perspective. Preferably, if the perspective is looking from behind on the vehicle representation, then the rear window of the vehicle representation is used as the defined region of the vehicle representation, if the perspective is looking somewhere from the front onto the vehicle representation, then the defined region comprises the windscreen representation of the vehicle representation, in case the defined perspective is looking somewhere from the side onto the vehicle representation, then preferably one of the side windows of the vehicle representation constitutes the defined region of the vehicle representation, and in case of a top view, the defined regions are constituted at least by the rear window and the windscreen of the vehicle representation, and optionally also by the side windows of the vehicle representation. Advantageously, by varying the perspective of the image representation, now a user cannot only change the view onto the environment, which is represented surrounding the vehicle representation, but also the view on the second part of the environment represented as reflection on at least part of the vehicle representation.

According to another advantageous embodiment of the invention, a degree of reflection of the mirrored image is adjustable, wherein the mirrored image and the defined region of the vehicle representation are cross faded in dependency of the adjusted degree of reflection. Thereby, the degree of reflection can be adjusted automatically, for example in dependency of the driving situation. For example, in normal driving situations the degree of reflection can be set to 20%, meaning that on the defined region of the vehicle representation 20% of the mirrored image are visible and 80% of the defined region of the vehicle representation itself are visible, for example the window representation. A degree of reflection of 0% then means that no mirrored image is displayed and only the defined region of the vehicle representation is visible, and a degree of reflection of 100% then means that only the mirrored image can be seen, like an ideally reflective mirror, but nothing of the part of the vehicle represented in the defined region of the vehicle representation. When parking in a parking space, where environmental information is much more important than in normal driving situations, the degree of reflection can be increased, so that a user can now easily gather the environmental information presented by means of the mirrored image. However, the degree of reflection can also be adjustable by a user himself. For example the degree of reflection can be adjusted between 0 and 100%. This is very advantageous, as thereby a user can set the degree of reflection according to his preferences. At the same time, the user can also be provided with an option to turn on or turn off this glass reflection feature. In case the user turns off the displaying of the mirrored image, then the vehicle representation, especially the defined region, for example the windows of the vehicle representation, are shown for example transparent without or only with very week scene reflections.

The invention also relates to a computer program product comprising program code stored in a computer readable medium, and which when executed by a processor of an electronic control device causes the processor to provide an image representation of at least one first part of a captured environment of a vehicle within a defined viewport from a defined perspective, wherein the image representation includes a vehicle representation representing the vehicle and to display the image representation on a display device. Moreover, the computer program product further causes the processor when providing the image representation to represent at least one second part of the captured environment in form of a mirrored image of the at least one second part of the environment on a defined region of the vehicle representation.

Moreover, the invention also relates to a driver assistant system for a vehicle for providing an image representation of at least part of an environment of the vehicle on a display device, wherein the driver assistant system comprises at least one vehicle sensor, which is configured to capture at least partly the environment of the vehicle, a processing unit, which is configured to provide an image representation of at least one first part of the captured environment within a defined viewport from a defined perspective, wherein the image representation includes a vehicle representation representing the vehicle, and a display device, which is configured to display the image representation. Furthermore, the processing unit is configured when providing the image representation to represent at least one second part of the captured environment in form of a mirrored image of the at least one second part of the environment on a defined region of the vehicle representation.

Moreover, also a vehicle comprising a driver assistant system according to the invention shall be considered as pertaining to the invention.

The advantages described with regard to the method according to the invention and its embodiments similarly applying to the computer program product, the driver assistant system and the vehicle according to the invention.

Preferably, the at least one sensor is configured as at least one camera. Preferably the driver assistant system comprises several cameras, for example four cameras, like a front camera mounted on the front of the vehicle, a rear camera, mounted at the back of the vehicle, a left mirror camera, mounted on the left side mirror of the vehicle, and a right mirror camera, mounted on the right side mirror of the vehicle. At each time step these cameras can capture images of the environment of the vehicle, which can then be projected onto a given viewport from a defined virtual point of view defining the defined perspective, thereby providing respective output images, in which a vehicle representation is inserted and displayed on the display device, especially a display device of the vehicle.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Figure 2:
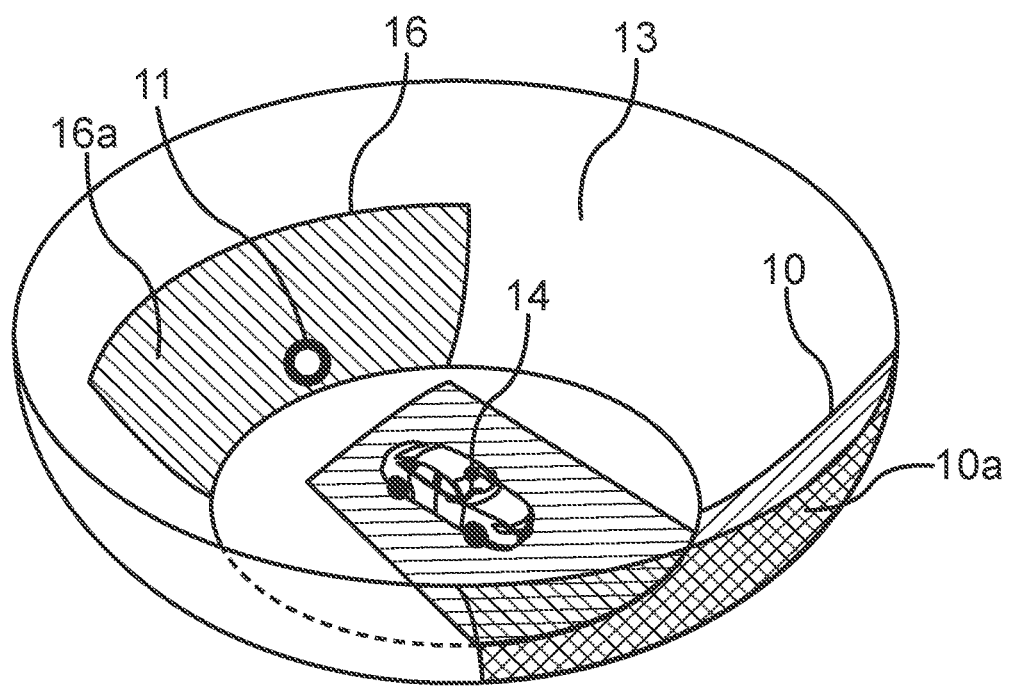
Figure 3:
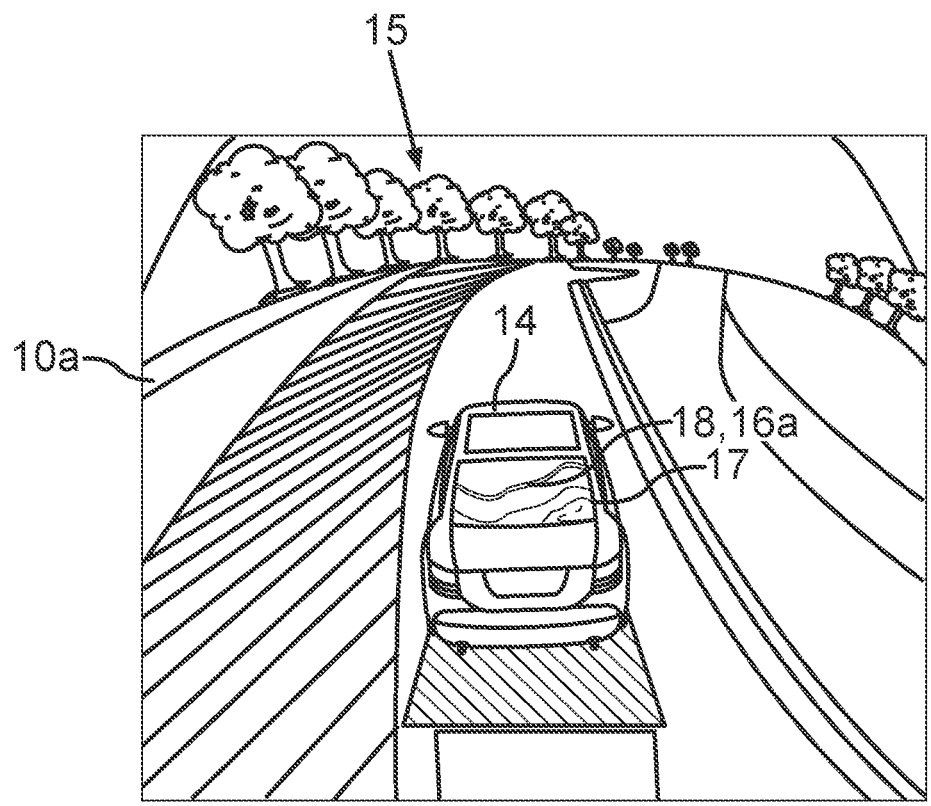
Figure 4:
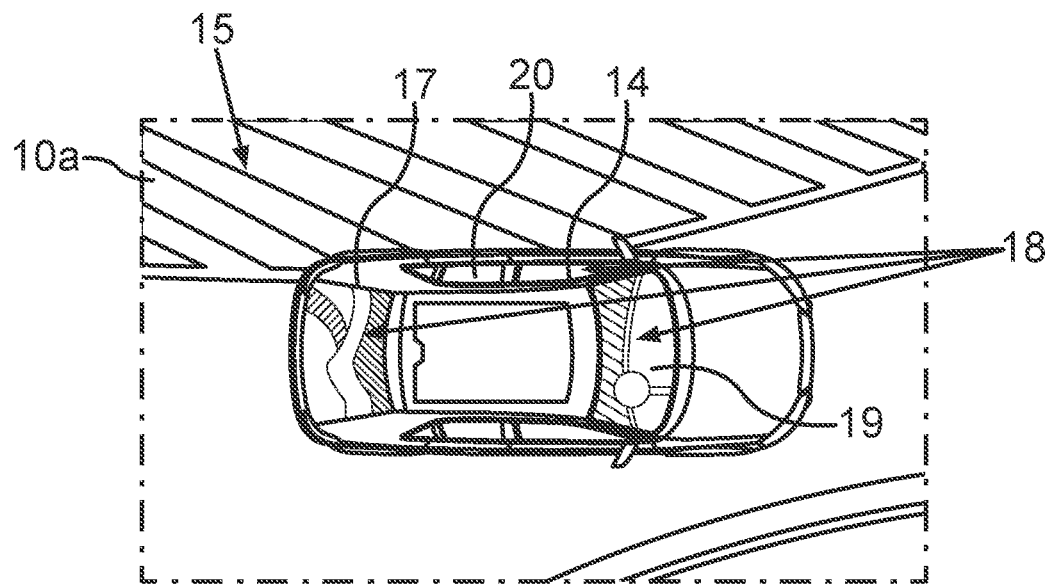

Therein Show:

FIG. 1 a schematic illustration of a vehicle with a driver assistant system according to an embodiment of the invention;

FIG. 2 a schematic illustration of a projective surface configured as a bowl with an inserted model of a vehicle according to an embodiment of the invention;

FIG. 3 a schematic illustration of the image representation displayed on the display device of the vehicle according to an embodiment of the invention; and FIG. 4 a schematic illustration of the image representation displayed on a display device of the vehicle according to another embodiment of the invention.

FIG. 1 shows a schematic illustration of a vehicle 1 comprising a driver assistance system 2 according to an embodiment of the invention. The driver assistance system 2 comprises at least one environment sensor, in this case four cameras 3, 4, 5, 6 namely a front camera 3, a rear camera 4, a left mirror camera 5 and a right mirror camera 6. Each of the cameras 3, 4, 5, 6 is may be configured as wide angle camera. Therefore a very large field of view can be captured by each of the cameras 3, 4, 5, 6. In this example the front camera 3 comprises a corresponding field of view FOV1, which is limited in the horizontal plane by the illustrated borderlines 3a. Analogously, the rear camera 4 comprises a corresponding field of view FOV2, which is limited in the horizontal plane by the corresponding borderlines 4a. The left mirror camera 5 comprises a corresponding field of view FOV3, which is limited in the horizontal plane by the illustrated borderlines 5a, and the right mirror camera 6 comprises a corresponding field of view FOV4, which is limited in the horizontal plane by the illustrated borderlines 6a. Therefore, each of the cameras 3, 4, 5, 6 is configured to capture a corresponding part 7a, 7b, 7c, 7d of the environment 7 of the vehicle 1. Moreover, the respective fields of view FOV1, FOV2, FOV3, FOV4 pairwise overlap.

The driver assistance system 2 also comprises a processing unit, which is configured as image processing module 8. The image processing module 8 maps the images captured by the respective cameras 3, 4, 5, 6 to a targeted surface, like a bowl 9 (see FIG. 2) or a flat 2D plane, and subsequently merges and renders the images to the viewport 10 (see FIG. 2) from arbitrarily chosen virtual camera at a virtual point of view 11, thereby defining a perspective. The image representation of the environment within that viewport 10 and additionally a representation of the vehicle 1 is then displayed on a display device 12 of the vehicle 1.

FIG. 2 shows a schematic illustration of a projective surface, which in this example is configured as a bowl 13, together with a 3D model of the vehicle 1, as an example of a vehicle representation 14. As described above, the images captured by the vehicle cameras 3, 4, 5, 6 are merged together and projected on the surface of the bowl 13. Furthermore, a certain viewport 10 is defined, which depends on the position of the chosen perspective, which is represented here by the virtual point of view 11. In this example, the perspective 11 is chosen such, that a view from behind on the vehicle 1, represented by the vehicle model or generally the vehicle representation 14 is provided. The resulting image representation 15, which is finally displayed on the display device 12 of the vehicle 1, is illustrated in FIG. 3.

Now advantageously, not only the first part 10a of the environment 7 of the vehicle 1, which is associated with the viewport 10 is represented, but also a second part 16a of the environment 7 of the vehicle 1, which is illustrated in FIG. 2 by the marked region behind the vehicle model 14, and which therefore can be seen as being associated with a second viewport 16. This second part 16a is displayed on a certain region of the vehicle representation 14, especially in this example on the rear window 17 (see FIG. 3) in form of a mirrored image 18 of this second part 16a of the environment 7. Thereby, additional environmental information can be displayed to the user of the vehicle 1 in a very natural and realistic way.

Generally, any window representation 17 can be used to display the mirrored image 18, e.g. also the representation of the windscreen 19, or the side windows 20 as illustrated in FIG. 4. Especially FIG. 4 shows a schematic illustration of another example of an image representation 15 in form of a top view image, where the virtual point of view 11 is positioned directly over the vehicle 1, which again is represented by a corresponding vehicle representation 14. In this case, the vehicle representation 14 is preferably provided by means of a 2D bit map image. The corresponding viewport 10 here in this example is the ground plane and advantageously, also in this case, other parts of the environment, which are not within that defined viewport, are presented as respective mirrored images 18 on the windows 17, 19, 20 of the vehicle representation 14.

Thereby it's especially advantageous, when the mirrored images 18 are presented on parts of the vehicle representation 14, which constitute windows 17, 19, 20, because this yields a very natural impression of a light reflection to the user. By means of showing additional parts of the environment in form of such mirrored images 18, e.g. using glass windows, critical scenes in the environment 7 can be reflected beyond the top view range according to the example presented in FIG. 4, or beyond any other selected viewport 10, like in the example of FIG. 3, which enormously helps to improve the driver's observation of the environment 7.

To provide such mirrored image 18, the calculation may follow strictly the physical light reflection law. For this purpose, a mirror plane can be defined, which can be determined by the geometry of the defined region of the vehicle representation 14, on which the mirrored image 18 is displayed, in case the vehicle representation 14 is provided in form of a 3D vehicle model 14. But also in case, the vehicle 1 is represented by a 2D bitmap image, the defined regions, for example the window regions, can be associated with a corresponding mirror plane on which the light from the environment 7 is reflected according to a model calculation, especially depending on the positon of the virtual point of view 11.

Moreover, when calculating the mirrored image 18, also defined deviations from the physical light reflection law may be admissible. This means that the scene shown on the glass can be predesigned to show the otherwise hided surround scenes such as critical scenes from the far corners of the vehicle 1. So advantageously, by means of such artificial deviations from the light reflection law, the field of view provided by means of this mirrored image 18 can be enlarged. In this case, image warp and viewport design can be applied to extend the field of view. Image warp and viewport design are techniques to transform the raw images of the real cameras 3, 4, 5, 6 to properly display more interesting image contents.

This reflection feature, namely showing parts of the environment as mirrored image, may be particularly useful for some vehicle operational maneuvers, such as the vehicle reversely parking to a parking slot. Moreover, also a level of reflection, defining how bright or how strong the reflection appears on the defined region of the vehicle representation 14, can be adjustable, especially by a user. For this purpose, the user can be provided with any kind of input means to adjust the level of reflection according to his preferences.

Also a default reflection level can be provided, to make the reflection as natural as possible, for example 20%. Furthermore, the user may also be provided with an option to turn on or turn off this glass reflection feature. So when this feature is turned off, the glass will be shown as transparent without or only with very weak scene reflections.

To conclude, by means of the invention or its embodiments additional possibly critical content can be displayed to a user in a very natural and realistic way without concealing any other relevant represented parts of the environment, which is thus very beneficial in many driving and parking situations and reduces the risk of missing critical information.

The invention claimed is:

1. A method for providing an image representation of at least part of an environment of a vehicle on a display device, comprising:
   capturing at least partly the environment of the vehicle by at least one vehicle sensor;
   providing an image representation of at least one first part of the captured environment within a defined viewport from a defined perspective, wherein the image representation includes a vehicle representation representing the vehicle, and
   displaying the image representation on the display device,
   wherein when providing the image representation at least one second part of the captured environment is represented in form of a mirrored image of the at least one second part of the environment on a defined region of the vehicle representation;
   wherein the defined region of the vehicle representation constitutes a part of the vehicle representation that relates to a window of the vehicle, the window being one selection from a windscreen, a rear window, a roof window and a side window;
   wherein the vehicle representation is provided in form of a vehicle model, and
   wherein a geometry of a mirror plane is determined by a geometry of the defined region of the vehicle model, on which the mirrored image is displayed.

2. The method according to claim 1, wherein the second part of the environment at least in part differs from the first part of the environment.

3. The method according to claim 1, wherein the mirrored image is determined in dependency of the defined perspective or a defined geometry of the mirror plane, which is associated with the defined region of the vehicle representation on which the mirrored image is displayed, or in dependency of a position or an orientation of the mirror plane relative to the defined perspective.

4. The method according to claim 1, wherein the vehicle representation is provided in form of a two-dimensional (2D) image of the vehicle comprising a bitmap image representing the vehicle from the defined perspective.

5. The method according to claim 1, wherein the vehicle representation is provided in form of a 2D image of the vehicle comprising a bitmap image representing the vehicle from the defined perspective.

6. The method according to claim 1:
   wherein the defined perspective is dynamically adjustable, and
   wherein the representation of the vehicle model and the mirrored image are dynamically adjusted in dependency of the dynamically adjusted perspective.

7. The method according to claim 1, wherein the defined region of the vehicle representation is changed in dependency of a change of the defined perspective.

8. The method according to claim 1, wherein the mirrored image is determined based on a physical light reflection law.

9. The method according to claim 1, wherein the mirrored image is determined based on a defined deviation from a physical light reflection law.

10. The method according to claim 1, wherein the mirrored image is determined based on a defined deviation from a physical light reflection law such that a field of view from the defined perspective onto the second part of the environment represented by the mirrored image is larger than it would be in case mirrored image was determined based on the physical light reflection law without defined deviation.

11. The method according to claim 1:
wherein a degree of reflection of the mirrored image is adjustable, and
wherein the mirrored image and the defined region of the vehicle representation are cross-faded in dependency of the adjusted degree of reflection.

12. A non-transitory computer readable medium storing instructions executable by a computer processor of an electronic control device, the instructions comprising functionality for:
providing an image representation of at least one first part of a captured environment of a vehicle within a defined viewport from a defined perspective, wherein the image representation includes a vehicle representation representing the vehicle;
displaying the image representation on a display device,
wherein when providing the image representation, at least one second part of the captured environment is represented in form of a mirrored image of the at least one second part of the environment on a defined region of the vehicle representation;
wherein the defined region of the vehicle representation constitutes a part of the vehicle representation that relates to a window of the vehicle selected from one of a windscreen, a rear window, a roof window, and a side window;
wherein the vehicle representation is provided in form of a vehicle model, and
wherein a geometry of a mirror plane is determined by a geometry of the defined region of the vehicle model, on which the mirrored image is displayed.

13. A driver assistance system for a vehicle for providing an image representation of at least part of an environment of the vehicle on a display device, the driver assistance system comprising:
at least one vehicle sensor configured to capture at least partly the environment of the vehicle;
a processing unit configured to provide an image representation of at least one first part of the captured environment within a defined viewport from a defined perspective, wherein the image representation includes a vehicle representation representing the vehicle;
a display device configured to display the image representation,
wherein the processing unit is configured, when providing the image representation, to represent at least one second part of the captured environment in form of a mirrored image of the at least one second part of the environment on a defined region of the vehicle representation;
wherein the defined region of the vehicle representation constitutes a part of the vehicle representation that relates to a window of the vehicle selected from one of a windscreen, a rear window, a roof window and a side window;
wherein the vehicle representation is provided in form of a vehicle model, and
wherein a geometry of a mirror plane is determined by a geometry of the defined region of the vehicle model, on which the mirrored image is displayed.

* * * * *